United States Patent
Gage et al.

(10) Patent No.: US 7,688,689 B2
(45) Date of Patent: Mar. 30, 2010

(54) HEAD WITH OPTICAL BENCH FOR USE IN DATA STORAGE DEVICES

(75) Inventors: Edward Charles Gage, Apple Valley, MN (US); Patrick Breckow Chu, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1391 days.

(21) Appl. No.: 10/787,609

(22) Filed: Feb. 26, 2004

(65) Prior Publication Data

US 2005/0190682 A1 Sep. 1, 2005

(51) Int. Cl.
*G11B 7/00* (2006.01)
(52) U.S. Cl. .................................... 369/44.14
(58) Field of Classification Search ........................ None
See application file for complete search history.

(56) References Cited

U.S. PATENT DOCUMENTS

| | | | |
|---|---|---|---|
| 4,865,407 A * | 9/1989 | Suzuki et al. ................. 385/31 |
| 5,073,003 A | 12/1991 | Clark |
| 5,152,597 A | 10/1992 | Barnard |
| 5,218,582 A | 6/1993 | Marchant |
| 5,253,935 A * | 10/1993 | Uken et al. .................... 359/24 |
| 5,550,088 A | 8/1996 | Dautartas et al. |
| 5,771,323 A | 6/1998 | Trott |
| 5,793,914 A | 8/1998 | Sasaki |
| 5,815,623 A | 9/1998 | Gilliland et al. |
| 5,850,375 A | 12/1998 | Wilde et al. |
| 5,854,867 A | 12/1998 | Lee et al. |
| 5,911,021 A | 6/1999 | MacDonald et al. |
| 5,959,808 A | 9/1999 | Fan et al. |
| 5,986,995 A * | 11/1999 | He et al. ................. 369/112.07 |
| 5,998,906 A | 12/1999 | Jerman et al. |
| 6,034,938 A | 3/2000 | Heanue et al. |
| 6,058,094 A | 5/2000 | Davis et al. |
| 6,081,499 A | 6/2000 | Berger et al. |
| 6,097,575 A | 8/2000 | Trang et al. |
| 6,115,521 A | 9/2000 | Tran et al. |
| 6,181,673 B1 | 1/2001 | Wilde et al. |
| 6,282,351 B1 | 8/2001 | Go et al. |
| 6,359,752 B1 * | 3/2002 | Imamura .................. 360/234.7 |
| 6,396,667 B1 | 5/2002 | Zhang et al. |
| 6,469,843 B2 * | 10/2002 | Meyers ........................ 359/811 |
| 6,535,473 B1 | 3/2003 | Swanson et al. |
| 6,563,238 B1 | 5/2003 | Lee et al. |
| 6,574,190 B1 * | 6/2003 | Hu .............................. 369/300 |
| 6,593,677 B2 | 7/2003 | Behin et al. |
| 6,629,461 B2 | 10/2003 | Behin et al. |
| 6,996,033 B2 | 2/2006 | Dugas et al. |

(Continued)

*Primary Examiner*—Joseph H Feild
*Assistant Examiner*—Parul Gupta
(74) *Attorney, Agent, or Firm*—Robert P. Lenart, Esq.; Pietragallo Gordon Alfano Bosick & Paspanti, LLP

(57) ABSTRACT

A head assembly comprises a slider including a transducer and a coupler for coupling electromagnetic radiation into the transducer, and an optical bench positioned adjacent to the slider, the optical bench including a mirror and a lens for directing electromagnetic radiation onto the mirror, wherein electromagnetic radiation passing through the lens is reflected by the mirror and focused onto the coupler. A microactuator can be included to move at least a portion of the optical bench. Disc drives that include the head assembly and a method of making the head assembly are also included.

19 Claims, 5 Drawing Sheets

U.S. PATENT DOCUMENTS

| | | |
|---|---|---|
| 7,036,134 B2 * | 4/2006 | Nakata et al. .............. 720/689 |
| 7,428,194 B2 * | 9/2008 | Sohn et al. .............. 369/44.23 |
| 2001/0012182 A1 | 8/2001 | Boutaghou et al. |
| 2001/0040240 A1 | 11/2001 | Tatoh |
| 2002/0021055 A1 | 2/2002 | Lee et al. |
| 2002/0097520 A1 | 7/2002 | Bower et al. |
| 2002/0126420 A1 | 9/2002 | Yao et al. |
| 2002/0159192 A1 | 10/2002 | Wada et al. |
| 2002/0191327 A1 | 12/2002 | Hawwa et al. |
| 2003/0048036 A1 | 3/2003 | Lemkin |
| 2003/0062804 A1 | 4/2003 | Uchiyama |
| 2003/0123196 A1 | 7/2003 | Shiraishi et al. |
| 2003/0142597 A1 | 7/2003 | Park et al. |
| 2004/0028343 A1 * | 2/2004 | Hayasaka .............. 385/60 |
| 2004/0120064 A1 | 6/2004 | Dugas et al. |

* cited by examiner

HEAD WITH OPTICAL BENCH FOR USE IN DATA STORAGE DEVICES

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

This invention relates to optical devices, and more particularly to optical devices that can be used in heads used in data storage devices.

BACKGROUND OF THE INVENTION

In magnetic recording systems, information is stored in magnetic media that includes a layer of grains of magnetic material. Superparamagnetic instabilities become an issue as the grain volume is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy can demagnetize the stored data bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However with the available materials, magnetic recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information. Heat assisted magnetic recording (HAMR) allows for the use of small grain media, which is desirable for recording at increased areal densities, with a larger magnetic anisotropy at room temperature to assure a sufficient thermal stability. Heat assisted magnetic recording can be applied to any type of magnetic storage media, including tilted media, longitudinal media, perpendicular media and patterned media.

Heat assisted magnetic recording requires a thermal source be brought into close proximity to the magnetic writer. The HAMR designs utilize an intense near field optical source to elevate the temperature of the media. When applying a heat or light source to the medium, it is desirable to confine the heat or light to the track where writing is taking place and to generate the write field in close proximity to where the medium is heated to accomplish high areal density recording. In addition, for heat assisted magnetic recording (HAMR) one of the technological hurdles to overcome is to provide an efficient technique for delivering large amounts of light power to the recording medium confined to spots of, for example, 50 nm or less. A variety of transducer designs have been proposed for this purpose.

Several methods to deliver the light into the optical elements on the optical/magnetic slider have been considered. These methods include laser on slider, free space, and fiber to slider. Laser on slider is viewed as a possibility for future generations, but requires unique laser diodes and creates a high thermal load on the slider. The free space delivery has made rapid progress using a grating to couple the light into a waveguide on the slider. Fiber to the slider has been tried using a polarization maintaining (PM) fiber having a 125 micron thickness. However, the thickness of the fiber caused unacceptable forces on the slider and the head required extensive active alignment.

During the telecom explosion of the past few years a number of specialty fibers were developed. In order to minimize bending losses and allow smaller package sizes, very thin low stiffness fibers were developed. These fibers had diameters from 60-85 microns, which reduced their stiffness by almost a factor of ten. Also polarization maintaining (PM) fibers were developed that were mechanically keyed to place the PM axis at a specified angle to a mechanical datum in the fiber mount.

There is a need for heads that can provide fiber on slider light delivery without the need for active alignment of the optical components. Such heads can be used in heat assisted magnetic recording or optical recording devices.

SUMMARY OF THE INVENTION

A head assembly constructed in accordance with this invention comprises a slider including an optical transducer, a coupler for coupling electromagnetic radiation into the transducer, and an optical bench positioned adjacent to the slider, the optical bench including mirror and a lens for directing electromagnetic radiation onto the mirror, wherein electromagnetic radiation passing through the lens is reflected by the mirror and focused onto the coupler.

The electromagnetic radiation can be directed onto the lens using an optical fiber or a laser mounted on the optical bench. The optical fiber can comprise a polarization maintaining optical fiber, and the optical bench can define a groove for receiving the optical fiber and a pocket for receiving the lens. The optical fiber can be keyed in the groove.

The coupler can comprise a grating. The optical bench can include an alignment edge positioned adjacent to an end of the slider. A microactuator can be provided for moving at least a portion of the slider assembly. The microactuator can comprise a plurality of fingers and electrical conductors for supplying voltage to the fingers.

In another aspect, the invention encompasses a disc drive comprising: a motor for rotating a storage medium and an arm for positioning a head assembly adjacent to a surface of the storage medium, wherein the head assembly comprises a slider including an optical transducer and a coupler for coupling electromagnetic radiation into the transducer; and an optical bench positioned adjacent to the slider, the optical bench including a mirror and a lens for directing electromagnetic radiation onto the mirror, wherein electromagnetic radiation passing through the lens is reflected by the mirror and focused onto the coupler.

The invention also provides a method of making head assemblies comprising: fabricating a plurality of optical benches on a first bar, fabricating a plurality of sliders on a second bar, bonding the first bar to the second bar to form a plurality of slider assemblies, and separating the slider assemblies.

DETAILED DESCRIPTION OF THE INVENTION

This invention encompasses devices that can be used in heat assisted magnetic recording or optical recording, as well as disc drives that include the devices.

Figure 1:
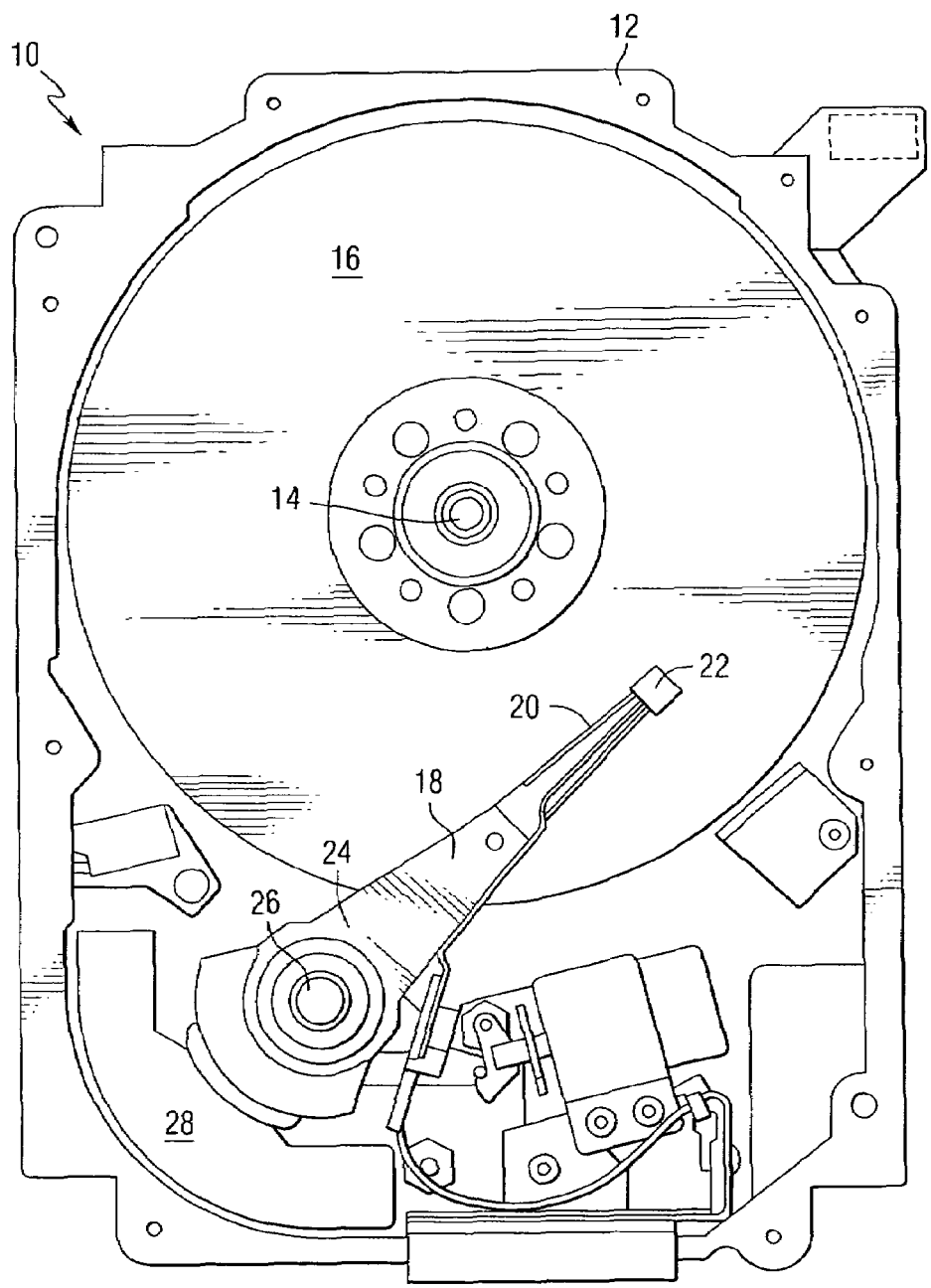
FIG. 1 is a pictorial representation of a disc drive that can include recording heads constructed in accordance with this invention.

FIG. 1 is a pictorial representation of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, electromagnetic radiation is used to heat a portion of a surface of a magnetic storage medium. This facilitates the subsequent recording of magnetic information in the heated portion of the medium. Heat assisted magnetic recording heads include a component for directing electromagnetic radiation onto the surface of the storage medium, and an associated component for producing a magnetic signal for affecting the magnetization of the storage medium.

Figure 2:
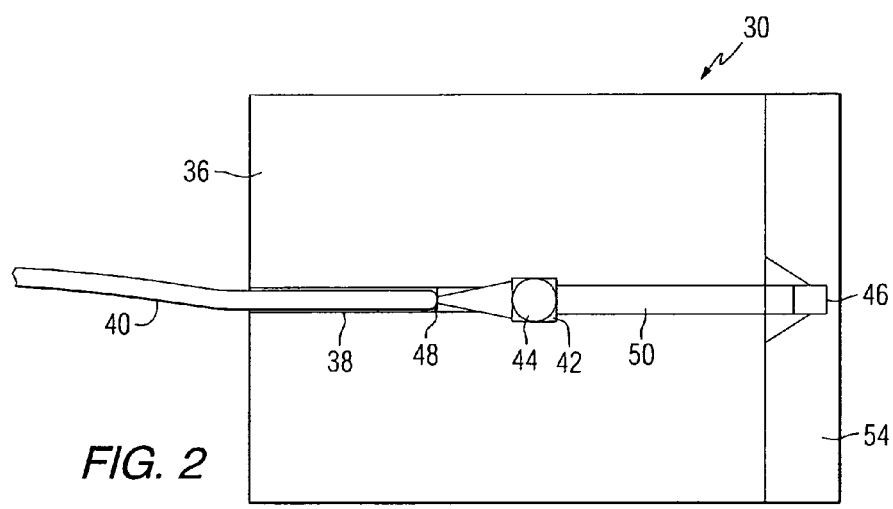
FIG. 2 is a bottom view of an optical bench constructed in accordance with the invention.
Figure 3:
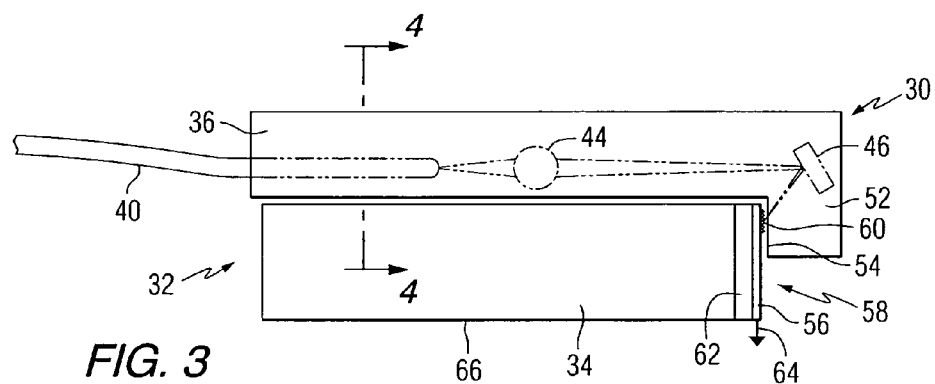
FIG. 3 is a side view of the head assembly that includes the optical bench of FIG. 2.

FIG. 2 is a bottom view of an optical bench 30 constructed in accordance with this invention. FIG. 3 is a side view of a slider assembly 32 that includes the optical bench of FIG. 2. The slider assembly includes an optical bench 30 that is mounted adjacent to a top surface of a slider 34. The optical bench includes a substrate 36 including a first groove 38 for receiving an optical fiber 40, a pocket 42 for receiving a lens 44, and a mirror 46 to reflect electromagnetic radiation transmitted through the optical fiber and lens. The mirror can be glued on or fabricated into the substrate. The optical fiber serves as a means for directing electromagnetic radiation onto the lens. A stop 48 is provided in groove 38 to position an end of the optical fiber. A source of electromagnetic radiation, such as a laser, would be used to inject the electromagnetic radiation into the optical fiber. An optical channel 50 is provided for transmission of electromagnetic radiation between the fiber, the lens, the mirror and the slider. The electromagnetic radiation can be in the form of infrared, visible light or ultraviolet radiation. For the purposes of this description, such electromagnetic radiation is generically referred to as light. The substrate can be silicon, which has a low cost and well-known processing techniques. Alternatively, the substrate can be AlTiC, GaAs, SiGe, GaN, GaP, or $Al_2O_3$.

An alignment tab 52, having an edge 54, is provided to align the optical bench to the slider. When the optical bench is positioned adjacent to the slider, the alignment edge 54 extends along an end of the slider. The groove 38 can be shaped to accept the optical fiber, and can be for example a V-groove, U-shaped groove, or a channel having a rectangular cross section.

The slider 34 includes an optical transducer in the form of a planar waveguide 56 at one end 58 of the slider and a coupler 60 for coupling light into the waveguide in the form of a grating. The grating can include a plurality of parallel grooves or ridges that extend in a direction substantially parallel to a plane of a magnetic medium. A magnetic write element 62 is located adjacent to the waveguide 56. Light 64 exits from the waveguide at an air bearing surface 66 of the slider. The optical components and relative positions of those components are chosen such that light transmitted through the optical fiber and lens, and reflected by the mirror is focused onto the grating. Both the grating and waveguide are polarization sensitive. The polarization of the light can be parallel to the grooves of the grating for transmission of the transverse electric (TE) mode in the waveguide. The beam is brought to a soft focus, of for example 60 µm diameter, to cover the grating surface with a numerical aperture of about 0.01.

Figure 4:
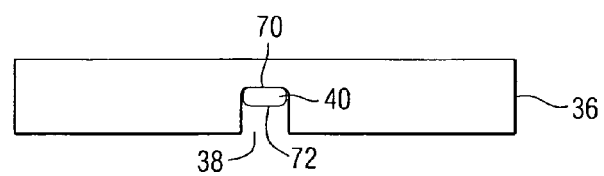
FIG. 4 is a cross-sectional view of the head of FIG. 3 taken along line 4-4.

FIG. 4 is a cross-sectional view of the slider of FIG. 3 taken along line 4-4. In FIG. 4, the optical fiber 40 is shown to be a polarization maintaining fiber that is mechanically keyed using flat surfaces 70 and 72. By using a small diameter, mechanically keyed PM fiber, many of the deficiencies of previous fiber to slider designs can be overcome. In general, smaller sized optical fibers are better, but mechanical keying limits the optical fiber size to a range of about 60 µm to about 80 µm.

The passive alignment fiber to slider light delivery structure can be fabricated using silicon bench technology. A flip chip optical bench in silicon can be created using standard silicon processing and then bonded to the slider. To construct the optical bench, a silicon wafer can be etched to form a plurality of cells with grooves for receiving an optical fiber, a pocket to hold a ball lens and a mirror surface as shown in FIGS. 2 and 3. An optical path is also etched between the fiber and the lens and between the lens and the mirror. Alignment features can be etched to form a stop for the fiber and to allow the bench to align to the slider. Marks can also be etched to define saw alleys. Other alignment features can be added to maintain the relative position of the optical bench and the slider.

The mirror can be an etched or mounted device having a high reflectivity, such as vacuum deposited Ag or Al. The mirror can be coated with a low index dielectric enhancement such as $Al_2O_3$, MgF, $SiO_2$ or $Ta_2O_5$ to boost reflectivity. Electrical contacts and vias can also be deposited at this stage. The wafer can then be sawed or etched into bars.

Figure 5:
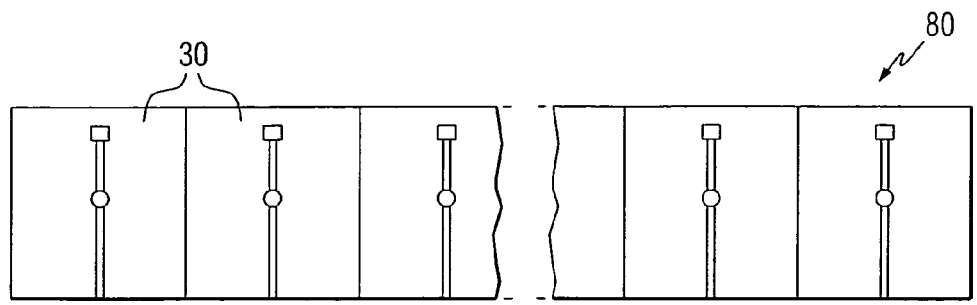
FIG. 5 is a plan view of a bar of optical benches.

FIG. 5 is a plan view of a bar 80 containing a plurality of optical benches 30. The fiber and the ball lens can be installed at the bar level. The fiber can be passively located in the groove and inserted to the stop and then glassed or epoxied in place. PM fiber, such as D, rectangular or triangular PM fiber, can be rotationally keyed to fix the polarization axis in a predetermined position relative to the other components of the slider assembly. The lens can be passively placed and glassed, epoxied, or thermally fit into place. The groove can be etched to have a shape that matches the cross section of the fiber.

The bar of flip chip optical benches can then be mated to a bar of optical sliders. The bond between the bar of optical benches and the bar of sliders could be epoxy, solder, frit, etc. The alignment edge 54 in the optical bench provides for passive alignment of the optical bench with respect to the slider. The optical beam would then be incident on the grating coupler with all 6 degrees of freedom and passively aligned at the bar level.

The bars can then be cut into individual slider assemblies. The combination can have dimensions comparable to established pico height with femto slider dimensions. The slider to wafer yield could be at the femto rate since the number of sliders per wafer increases as the slider size decreases. Electrical connections could also be provided through or on the silicon bench.

With this invention, the fiber can be brought to the slider and secured to an optical bench that would be compatible with the grating coupler. This allows passive alignment at the bar or slider level.

Figure 6:
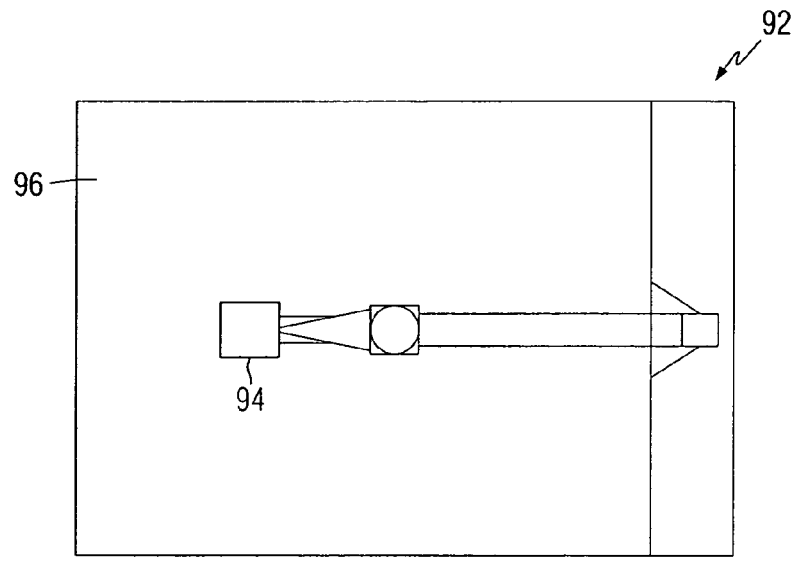
FIG. 6 is a bottom view of another optical bench constructed in accordance with this invention.
Figure 7:
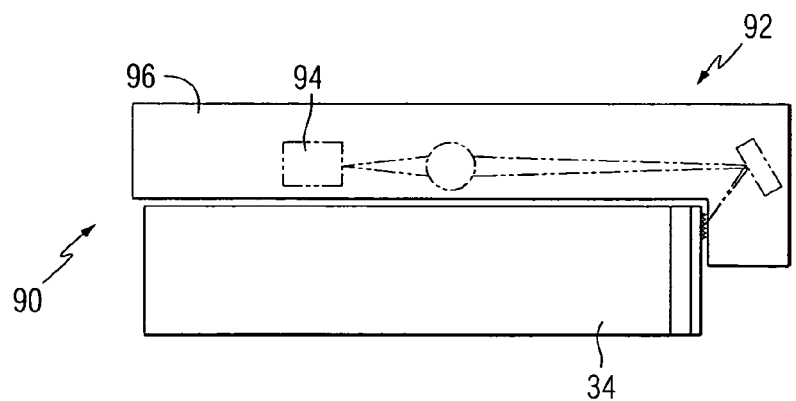
FIG. 7 is a side view of a head assembly that includes the optical bench of FIG. 6.

In an alternative example, a laser could be installed on the optical bench instead of a fiber. FIG. 6 is a bottom view of another optical bench constructed in accordance with this invention. FIG. 7 is a side view of a slider assembly that includes the optical bench of FIG. 6. The slider assembly 90 of FIG. 7 is similar to that of FIG. 3 except that the optical bench 92 includes a laser 94 mounted on the substrate 96. The other elements of the slider of FIG. 7 are the same as the elements of the slider of FIG. 3.

While the described examples show the use of a ball lens, various lens types can be used to allow beam shaping at the grating. High quality lenses and precise alignment are expected to increase coupling efficiency.

Hybrid silicon/AlTiC slider designs can be adapted for micro actuation. A microactuator may be used for track following or skew correction. Track following or disturbance rejection can be accomplished by moving the whole slider (or just the transducer element) cross-track, or laterally across the media and perpendicular to the suspension arm. However, rotation motion is needed for skew correction. A co-located microactuator can be incorporated inside the micro-optical bench to apply force directly to the slider or the transducer element.

Figure 8:
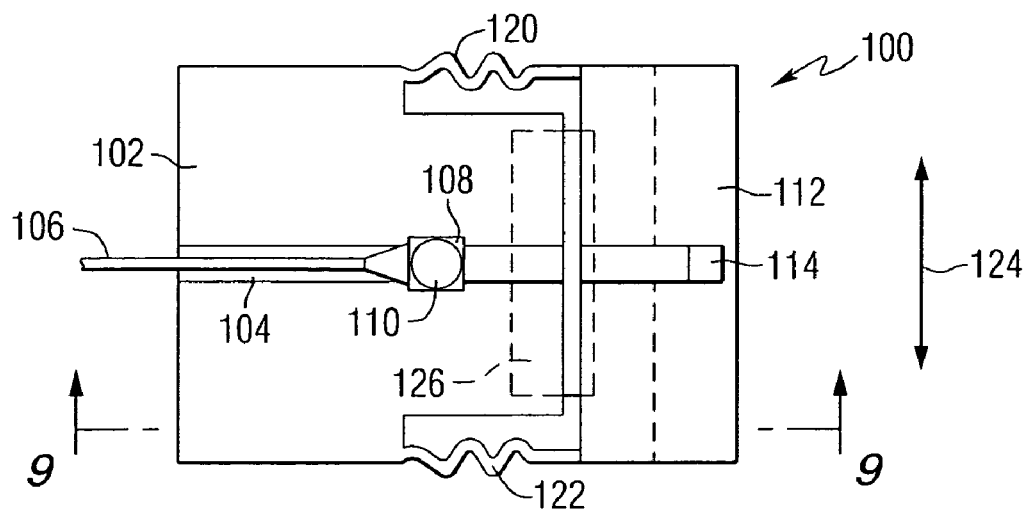
FIG. 8 is a schematic representation of an optical bench with an embedded micro-actuator.
Figure 9:
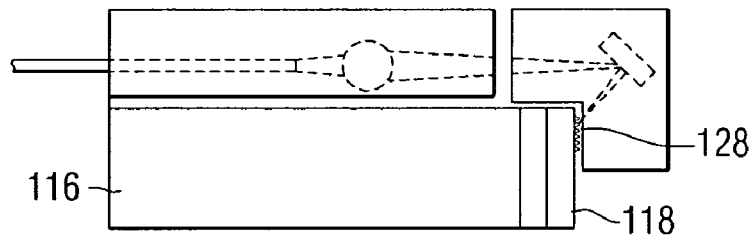
FIG. 9 is a cross-sectional view of a head assembly that includes the micro-optical bench of FIG. 8.

FIG. 8 is a schematic representation of a micro-optical bench with an embedded micro-actuator. FIG. 9 is a cross-sectional view of a slider assembly that includes the micro-optical bench of FIG. 8 taken along section line 9-9 in FIG. 8.

In the example of FIGS. 8 and 9, the micro-optical bench 100 is divided into two sections: a stationary portion 102 which includes a channel 104 for receiving an optical fiber 106 and a pocket 108 for receiving a lens 110, and a movable head 112 which supports the reflective optics in the form of a mirror 114. A slider 116 that includes an optical transducer 118, is attached to the movable portion of the optical bench. The two portions of the optical bench are coupled by flexible springs 120 and 122, to provide compliance in the cross-track direction illustrated by arrow 124, and high stiffness in other directions (such as pitch, roll, and bending). The flexible spring also serves to attenuate vibration from the suspension, the flex-on suspension, and the fiber, transmitted to the slider and transducer element. An actuator 126 can be mounted between the stationary portion and the moveable portion to move the moveable portion with respect to the stationary portion. Light is delivered by the optical fiber to the lens and reflected by the mirror onto a coupler in the form of a grating 128 on the transducer 118.

Figure 10:
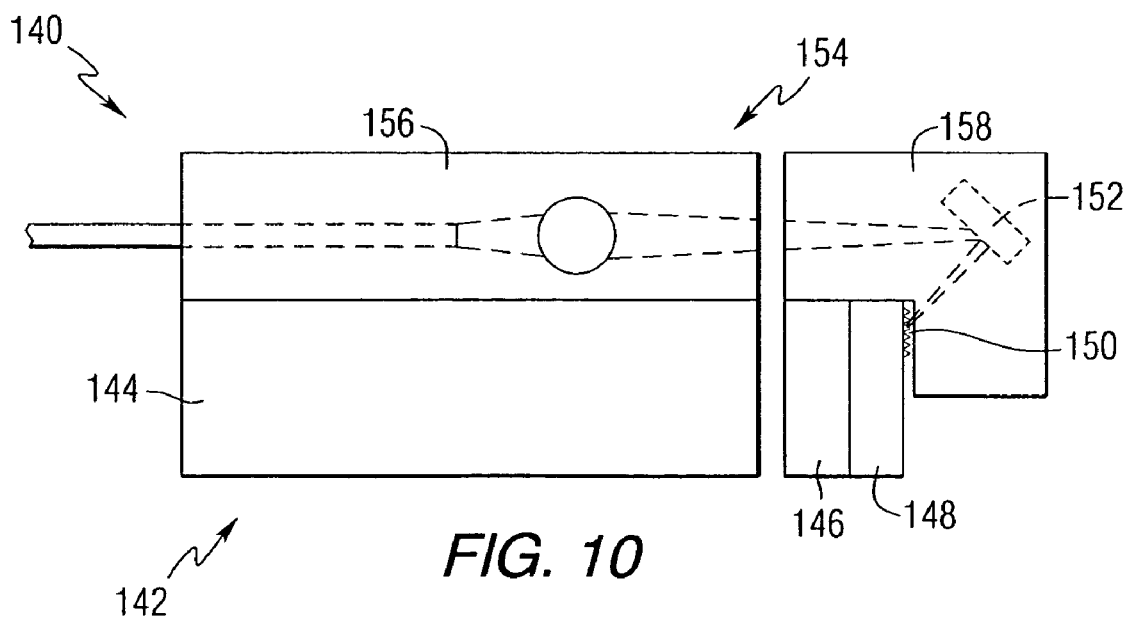
FIG. 10 is a cross-sectional view of another head assembly.

An alternative implementation actuates only the transducer element instead of the slider. FIG. 10 is a cross-sectional view of a slider assembly 140 that incorporates this concept. The slider assembly 140 includes a slider 142 having a first portion 144 and a second portion 146. The second portion includes an optical transducer 148 in the form of a planar waveguide. A grating coupler 150 is provided on the waveguide to couple light reflected from the mirror 152 into the waveguide. The optical bench 154 includes a first portion 156 attached to the first portion of the slider, and a second portion 158 attached to the second portion of the slider. The first and second portion of the optical bench can be coupled to each other by flexible springs and a microactuator assembly as shown in FIG. 8.

By moving the transducer element only, and thus substantially less mass, the actuation bandwidth of the example of FIG. 10 could be up to 3 or more times higher than for examples in which the whole slider is moved. Less actuation force (voltage, and power) will also be required. To fabricate the slider assembly of FIG. 10, the transducer element and the air bearing slider can be fabricated in separate wafers. After being diced to individual parts, the transducer may be attached to the movable head section of the micro-optical bench while the air bearing slider can be attached to the stationary base section of the micro-optical bench. Automated pick-and-place machines can perform this assembly process. In any case, the micro-optical bench with micro-actuator combination is applicable to traditional sliders with transducers as well as two-part sliders as described.

Figure 11:
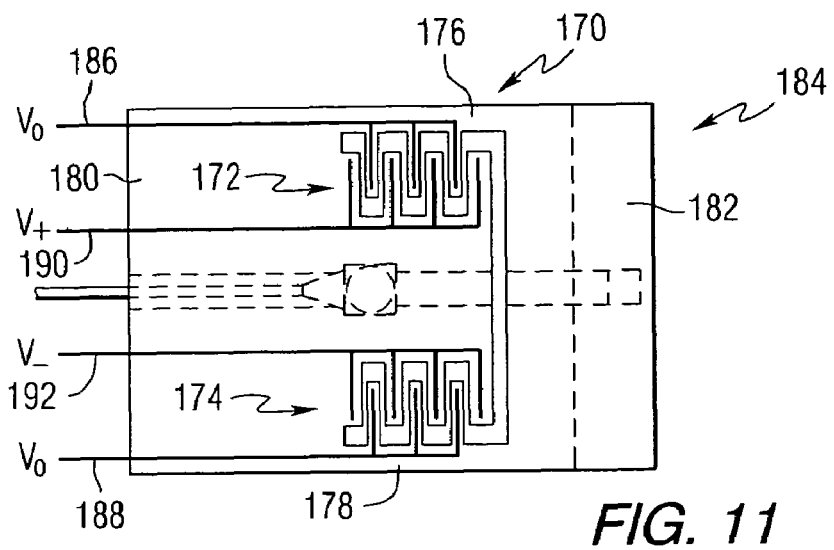
FIGS. 11 and 12 are schematic representations of additional head assemblies with embedded micro-actuators.
Figure 12:
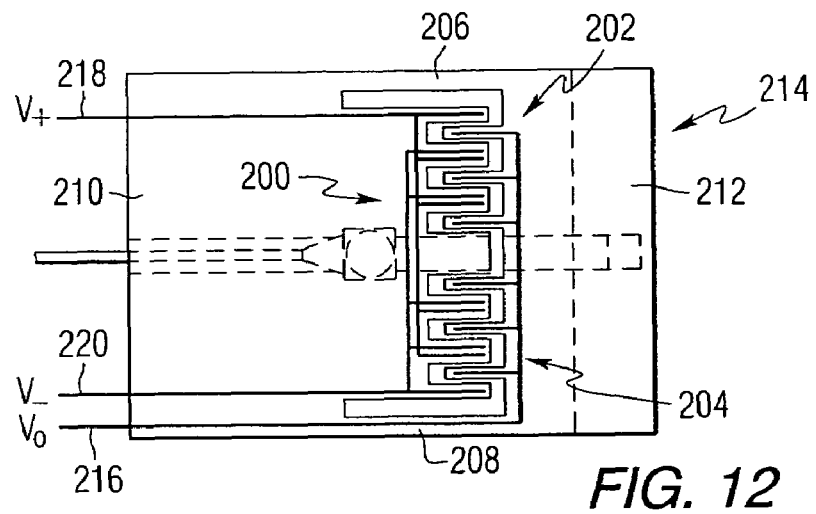

The actuator to be embedded in the micro-optical bench may be based on, but not limited to, electrostatic, magnetic, and piezoelectric principles. FIGS. 11 and 12 are schematic representations of micro-optical benches with embedded micro-actuators.

In the example of FIG. 11, an electrostatic actuator 170 with inter-digitated groups of actuation fingers 172 and 174 form variable capacitors that can be fabricated into the micro-optical bench. Flexible springs 176 and 178 connect the first portion 180 and the second portion 182 of the optical bench 184. Electrodes 186 and 188 are connected to a bias voltage $V_o$, and electrodes 190 and 192 are used to supply positive $V_+$ and negative $V_-$ voltage to the actuation fingers. The applied voltage causes the actuation fingers to either move toward each other or away from each other, thereby causing the moveable portion of the optical bench to move with respect to the stationary portion.

In the example of FIG. 12, an electrostatic actuator 200 with inter-digitated groups of actuation fingers 202 and 204 form variable capacitors that can be fabricated into the micro-optical bench. Flexible springs 206 and 208 connect the first portion 210 and the second portion 212 of the optical bench 214, Electrode 216 is connected to a bias voltage $V_o$, and electrodes 218 and 220 are used to supply positive $V_+$ and negative $V_-$ voltage to the actuation fingers.

The actuation fingers can be parallel or normal to the axis of motion (cross-track) as shown in FIGS. 11 and 12. The actuation fingers must be insulated so that when the movable head is biased properly with a bias voltage $V_o$, it will move left or right (or up or down) depending on the voltage values of $V_+$ and $V_-$. Many voltage biasing schemes are possible. Insulated fingers with conductive properties can be fabricated by deep reactive ion etching (DRIE) silicon, plated metal, polysilicon, oxide, SU-8 photoresist, and many other materials. These structures can be fabricated on the wafer level using etching and deposition steps that are compatible with those used to fabricate the other parts of the micro-optical bench.

As shown in FIGS. 11 and 12, straight beams can be used for the flexible springs and actuation fingers. The several examples illustrated in the drawings have symmetrical configurations, which exhibit mass symmetry on opposite sides of a plane passing through the groove, lens and mirror. A symmetrical design can improve the actuator and suspension performance. However, the shape of the actuator fingers and flexible springs can be optimized to yield a large cross-track stroke with minimal displacement or rotation in other axes.

A translation actuator can be used to move the portion of the slider to which it is attached, either the whole slider or the transducer element. Cross-track motion of the head (with the reflective mirror and the slider) will result in a translation of the optical spot on the optical grating. However, for movement of plus or minus a few microns (corresponding to the actuation stroke), the resulting small change in optical power directed into the grating is acceptable.

Figure 13:
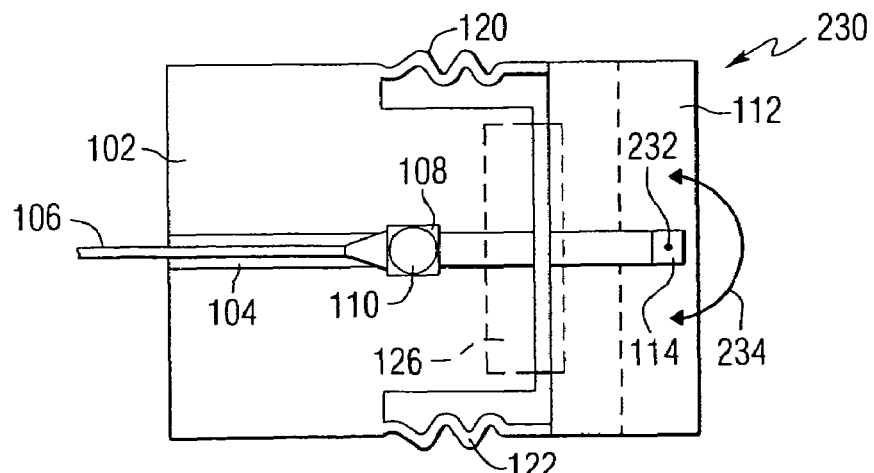
FIG. 13 is a schematic representation of another head assembly.

For skew correction, it is also possible to incorporate a rotational actuator instead of a translation actuator. FIG. 13 shows an example slider assembly 230 in which a rotational actuator is coupled to the mirror 114 to rotate the mirror about an axis 232, as illustrated by arrow 234. In this case, the rotational actuator pivots in such a way that the optical path length from the ball lens to the grating remains constant.

While the present invention has been described in terms of several examples, it will be apparent to those skilled in the art that various changes can be made to the disclosed examples without departing from the scope of the invention as defined by the following claims.

What is claimed is:

1. A head assembly comprising:
   a slider including a transducer and a coupler for coupling electromagnetic radiation into the transducer;
   an optical bench positioned adjacent to the slider, the optical bench including a mirror and a lens for directing electromagnetic radiation onto the mirror, wherein electromagnetic radiation passing through the lens is reflected by the mirror and focused onto the coupler; and
   an optical fiber for directing electromagnetic radiation onto the lens, wherein the optical bench defines a groove for receiving the optical fiber and a pocket for receiving the lens.

2. A head assembly according to claim 1, wherein the optical fiber comprises a polarization maintaining optical fiber.

3. A head assembly according to claim 2, wherein the optical fiber is keyed in the groove.

4. A head assembly according to claim 1, further comprising a laser for directing electromagnetic radiation onto the lens.

5. A head assembly according to claim 1, wherein the coupler comprises:
   a grating.

6. A head assembly according to claim 1, wherein the optical bench includes an alignment edge positioned adjacent to an end of the slider.

7. A head assembly according to claim 1, further comprising a microactuator for moving a portion of the optical bench.

8. A head assembly according to claim 7, wherein the portion of the optical bench includes the mirror.

9. A head assembly according to claim 8, wherein the microactuator comprises:
   a plurality of actuator fingers positioned for relative movement upon the application of voltage to the fingers.

10. A head assembly according to claim 1, wherein the optical bench is symmetric on opposite sides of a plane passing through the lens and mirror.

11. A disc drive comprising:
    a motor for rotating a storage medium; and
    an arm for positioning a head assembly adjacent to a surface of the storage medium;
    wherein the head assembly comprises a slider including a transducer and a coupler for coupling electromagnetic radiation into the transducer;
    an optical bench positioned adjacent to the slider, the optical bench including a mirror and a lens for directing electromagnetic radiation onto the mirror, wherein electromagnetic radiation passing through the lens is reflected by the mirror and focused onto the coupler; and
    an optical fiber for directing electromagnetic radiation onto the lens, and wherein the optical bench defines a groove for receiving the optical fiber and a pocket for receiving the lens.

12. A disc drive according to claim 11, wherein the optical fiber comprises a polarization maintaining optical fiber.

13. A disc drive according to claim 12, wherein the optical fiber is keyed in the groove.

14. A disc drive according to claim 11, further comprising a laser for directing electromagnetic radiation onto the lens.

15. A disc drive according to claim 11, wherein the coupler comprises:
    a grating.

16. A disc drive according to claim 11, wherein the optical bench includes an alignment edge positioned adjacent to an end of the slider.

17. A disc drive according to claim 11, further comprising a microactuator for moving a portion of the optical bench.

18. A disc drive according to claim 11, wherein the optical bench is symmetric on opposite sides of a plane passing through the lens and mirror.

19. A disc drive according to claim 17, wherein the portion of the optical bench includes the mirror.

* * * * *